Jan. 15, 1935.   A. GLASER   1,988,274
ELECTRICAL APPARATUS
Filed July 9, 1931
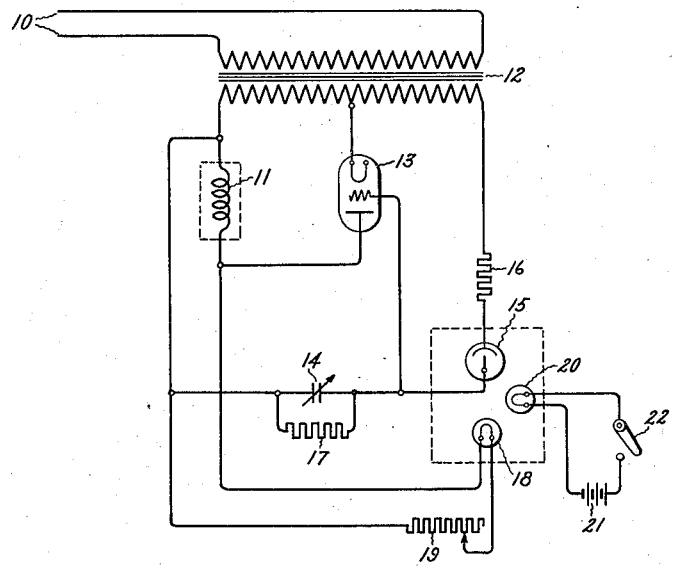
Inventor:
August Glaser,
by Charles E. Muller
His Attorney.

Patented Jan. 15, 1935

1,988,274

UNITED STATES PATENT OFFICE 1,988,274

ELECTRICAL APPARATUS

August Glaser, Berlin-Frohnau, Germany, assignor to General Electric Company, a corporation of New York Application July 9, 1931, Serial No. 549,794
In Germany August 15, 1930

6 Claims. (Cl. 250—41.5)

My invention relates to electrical apparatus for generating intermittent currents, and more particularly to such apparatus including an electric valve for generating low frequency, intermittent, unidirectional currents.

Heretofore there have been proposed various arrangements utilizing grid controlled electric valves for generating alternating current or intermittent unidirectional current. With certain arrangements of the prior art, however, it has been found either impossible to generate periodic currents having a low frequency or impractical to generate these low frequency currents because of the variability of the circuit elements upon which the frequency of the system depends.

It is an object of my invention to provide an improved electric circuit including a grid controlled electric valve which will generate an intermittent current of a very low frequency, for example, a frequency of several cycles per minute.

It is a further object of my invention to provide an improved electric circuit including a grid controlled electric valve which will generate a periodic current of substantially constant frequency irrespective of variations in surrounding conditions.

While my invention is of general application, it is particularly adapted for use in intermittently turning off and on electric lamps, such for example as are used in beacon lights, danger signals, traffic signals, etc. In accordance with my invention, a load circuit is connected to a source of current or energy supply circuits through an electric valve. A condenser, a photoelectric cell and a light source, energized from the load circuit, cooperate to render the electric valve alternately conductive and non-conductive. In this manner the load circuit is intermittently energized at a frequency depending upon the constants of the apparatus, for example the thermal characteristics of the light source, the size of the condenser, etc. According to one modification of my invention, the photo-electric cell is also exposed to the ambient illumination by means of which the apparatus is maintained inoperative for a predetermined intensity of illumination, for example normal daylight, and is automatically set into operation when the ambient illumination drops below a predetermined intensity. In accordance with another modification of my invention, an independent light source is provided which may be controlled in any desired manner to control the operation of the apparatus.

For a better understanding of my invention together with other and further objects thereof, reference is had to the following description, taken in connection with the accompanying drawing and its scope will be pointed out in the appended claims. The single figure of the accompanying drawing is a diagrammatic representation of an apparatus embodying my invention.

Referring now to the drawing I have illustrated an arrangement for transferring energy from an electrical energy supply circuit or a source of alternating current 10 to a load circuit represented by the device 11. This apparatus includes a transformer 12 having a primary winding connected to the alternating current supply circuit 10, and a secondary winding provided with an electrical midpoint. The load circuit represented by the device 11 is connected across one half of the secondary winding through an electric valve 13. Electric valve 13 is provided with an anode, a cathode, and a control grid and may be of any of the several types well known in the art, although I prefer to use a valve of the vapor electric discharge type. The cathode of the valve 13 is preferably connected to the midpoint of the transformer winding. Connected across the full secondary winding of the transformer is a series circuit including a variable condenser 14, a light responsive means such as a photo-electric cell 15, and, if desired, a protective resistor 16. In some cases it may be desirable to connect a high discharge resistance 17 across the condenser 14, especially so in case the resistance of the photo-electric cell 15, when dark, is extremely high. The photoelectric cell 15 is adapted to be illuminated from a lamp 18 which is connected across the load circuit represented by the device 11 through a variable resistor 19. As indicated by the dotted line, the photo-electric cell 15 and the lamp 18 preferably comprise a single enclosed unit.

In some cases however the enclosing casing may be omitted or so constructed that the photo-electric cell 15 is exposed to the surrounding illumination so that the apparatus is maintained in an inoperative condition whenever the illumination is above a predetermined intensity. In other cases it may be desirable to provide an additional light source 20 which may be energized from a battery 21 through a manually operable switch 22, located either in a local or a remote station. By this means it is possible to control the operation of the apparatus by the switch 22. In case the electric valve 13 is one which itself generates a considerable amount of light the lamp 18 may be omitted and electric valve 13 may be substituted therefor in cooperative relation with the photo-electric cell 15.

In explaining the operation of the above described apparatus it will be assumed that, initially, electric valve 13 is conductive and that the load circuit represented by the device 11 and lamp 18 are energized. Under these conditions the resistance of the photo-electric cell 15 is greatly reduced and, during the half cycle of the alternating supply potential when the electric valve 13 is conducting current, that is, when the left hand terminal of the secondary winding of transformer 12 is positive with respect to its right hand terminal, the condenser 14 becomes charged to substantially the full potential of the secondary winding of the transformer, the right hand terminal of the condenser approaching that of the right hand terminal of the transformer winding. At the same time the grid potential of electric valve 13 approaches that of the right hand terminal of the secondary winding of the transformer 12 and hence becomes negative with respect to its cathode potential during those half cycles when the valve 13 would normally be conductive. The valve 13 is now rendered completely non-conductive, the current to the load circuit 11 is interrupted and the lamp 18 is deenergized. As the lamp 18 cools off and its illumination decreases, the resistance of the photo-electric cell 15 increases to substantially an infinite value and the charge on the condenser 14 leaks off through its charging circuit or, if the resistance of the photo-electric cell is too high, through the discharge resistor 17. When the condenser 14 is substantially completely discharged, it will be noted that the grid potential of the valve 13 approaches the potential of the left hand terminal of the transformer winding, which, of course, is positive with respect to the cathode potential of valve 13 during the half cycles when the valve is normally conductive. In this way the valve 13 is again rendered conductive, current is supplied to the load circuit represented by the device 11 and the lamp 18 again energized. The above described cycle is repeated indefinitely and intermittent current impulses are supplied to the load circuit represented by the device 11. It will be apparent that the frequency of the intermittent current impulses are dependent primarily upon the value of the condenser 14 and the thermal characteristics of the lamp 18, so that this frequency may be varied within wide limits by properly selecting the constants of those two elements, or, as illustrated, the condenser 14 may be made variable and a variable resistor 19 may be included in the circuit of the lamp 18 so that frequency may be changed at will.

As stated above, if the enclosing casing surrounding the photo-electric cell 15 and the lamp 18 is omitted or if this casing is so constructed that the photo-electric cell 15 is exposed to the surrounding illumination, the apparatus will be maintained in an inoperative condition whenever the surrounding illumination exceeds a predetermined intensity. By this means the apparatus may be used to automatically turn on a flashing circuit or any intermittently energized load circuit whenever the daylight illumination falls below a predetermined intensity. It will be obvious also that a similar manual control is obtained by means of the auxiliary lamp 20, the battery 21 and the switch 22. It will also be obvious to those skilled in the art that, if the valve 13 generates a sufficient illumination for controlling the photo-electric cell 15, the lamp 18 may be replaced by the valve 13 in the circuit illustrated.

While I have described what I at present consider the preferred embodiment of my invention, it will be obvious to those skilled in the art that various changes and modifications may be made without departing from my invention and I therefore aim in the appended claims to cover all such changes and modifications as fall within the true spirit and scope of my invention.

What I claim as new and desire to secure by Letters Patent of the United States, is:

1. Apparatus for generating intermittent current impulses comprising a source of current, a load circuit, an electric valve comprising an anode, a cathode, and a control element, and interconnecting said source and said load circuit, and means including a light responsive means, a time responsive device and a source of light energized from said load circuit for periodically rendering said valve alternately conductive and non-conductive.

2. Apparatus for generating intermittent current impulses comprising a source of current, a load circuit, means interconnecting said source and said load circuit including an electric valve provided with a control grid, a circuit including a condenser and a photo-electric cell connected to said source for normally impressing a positive potential upon said grid, and a light source energized from said load circuit for illumining said cell to charge said condenser thereby to reduce the positive potential upon said grid.

3. Apparatus for generating intermittent current impulses comprising a source of alternating current, a transformer winding connected thereto and provided with an electrical midpoint, a load circuit, and means for connecting said load circuit across one portion of said winding including an electric valve provided with an anode, a cathode and a control grid, a circuit including a condenser and a photo-electric cell serially connected across said transformer winding, the grid of said valve being connected to the common connection of said condenser and photo-electric cell, and a light source energized from said load circuit for illumining said cell, said condensers and said light source cooperating to control the time interval between said intermittent current impulses.

4. In an electric translating circuit, the combination of a source of current, a load circuit, means including a light responsive means and a light source energized across said load circuit for intermittently energizing said load circuit from said source, and means including a second light source for maintaining said load circuit deenergized.

5. In an electrc translating circuit, the combination of a source of current, a load circuit, an electric valve interconnecting said source and said load circuit, and comprising an anode, a cathode, and a control element, a circuit including a photo-electric cell for rendering said valve conductive when said cell is unilluminated, said cell being normally exposed to an ambient illumination to maintain said valve non-conductive, and independent means for illumining said cell in accordance with the energization of said load circuit, whereby intermittent current impulses are delivered to said load circuit only when the ambient illumination drops below a predetermined intensity.

6. Apparatus for generating intermittent current impulses comprising a source of current, a load circuit, a discontinuous control electric valve comprising an anode, a cathode and a control element, said valve being connected between said source and said load circuit, a circuit including a photo-electric cell and a condenser interconnecting said source of current and said control element for controlling the conductivity of said valve, and means for illumining said cell in accordance with the conductivity of said valve.

AUGUST GLASER.